United States Patent
Rose et al.

(10) Patent No.: US 12,353,435 B2
(45) Date of Patent: Jul. 8, 2025

(54) DATA PROCESSING DURING DATA REPLICATION

(71) Applicant: SAP SE, Walldorf (DE)

(72) Inventors: Holger Rose, Bad Schoenborn (DE); Martin Hua, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/480,991

(22) Filed: Oct. 4, 2023

(65) Prior Publication Data

US 2024/0126780 A1 Apr. 18, 2024

Related U.S. Application Data

(60) Provisional application No. 63/415,477, filed on Oct. 12, 2022.

(51) Int. Cl.
*G06F 16/00* (2019.01)
*G06F 16/23* (2019.01)
*G06F 16/27* (2019.01)

(52) U.S. Cl.
CPC .......... *G06F 16/27* (2019.01); *G06F 16/2358* (2019.01)

(58) Field of Classification Search
CPC .... G06F 16/27; G06F 16/2358; G06F 16/273; G06F 16/215
See application file for complete search history.

(56) References Cited

U.S. PATENT DOCUMENTS

| 8,739,166 B2 | 5/2014 | Nos et al. |
| 8,949,678 B2 | 2/2015 | Brunswig et al. |
| 11,921,869 B1 * | 3/2024 | Peterson ............. G06F 21/6218 |
| 2019/0104102 A1 * | 4/2019 | Khan .................... H04L 9/0825 |
| 2021/0349916 A1 * | 11/2021 | Ofenloch ............. G06F 16/284 |

* cited by examiner

*Primary Examiner* — Alexander Khong
(74) *Attorney, Agent, or Firm* — Fish & Richardson P.C.

(57) ABSTRACT

Methods, systems, and computer-readable storage media for data replication. Data records associated with business entities are obtained. A plurality of data fields is defined for each record. A first set of data records is determined as associated with a first identifier of a first business entity. Data from a first set of data fields is selected from each data record of the first set of the data records. The first set of data fields are a subset of the plurality of data fields and is defined for evaluation of the first set of data records associated with the first business entity to determine a first data record from the first set of data records to be replicated from the data management system into a database system.

18 Claims, 7 Drawing Sheets

DATA PROCESSING DURING DATA REPLICATION

CLAIM OF PRIORITY

This application claims priority under 35 USC § 119(e) to U.S. Provisional Patent Application Ser. No. 63/415,477, filed on Oct. 12, 2022, entitled "DATA PROCESSING DURING DATA REPLICATION"; the entire contents of which are hereby incorporated by reference.

TECHNICAL FIELD

The present disclosure relates to computer-implemented methods, software, and systems for data processing.

BACKGROUND

As software complexity increases, the difficulty in replicating data across different systems to support increased functionality can become more cumbersome. This difficulty is compounded by the amount of data being replicated and processed. Some systems can store and process a certain amount of data, but if the data being replicated into that system exceeds a certain amount, the receiving system will fail and the process will have to be restarted, in whole or in part.

DETAILED DESCRIPTION

The present disclosure involves systems, software, and computer implemented methods for data processing to perform data replication between a data management system and a database system. The described technologies support reduced memory consumption during processing of records in a replication scenario from data at a data management system to a database system. In some scenarios, the replication of data can be performed between a shared data management system and a local database system. For example, the shared data management system can store data (e.g., administrative data that identifies database records stored for objects in the database such as employees, and business data for the objects that can include values for properties defined for the stored objects such as employee position, marital status, department, etc.), master data, rules and relationships that are defined for the data and can be used to interact with the data. As an example, a company would have data for its employees (for example, first name, last name, phone number, etc.) that can be stored in records in a database, where the database records can be identified with administrative data identifying the user who created the record, the time of the creation, or location, among other example data. A local database system receives data from the data management system for processing and that processing can be dependent on local rules and customs and have variations among them (for example, processing payroll in one country is different than processing payroll in another country even when geographically separated employees work for the same employer).

In some instances, data is to be replicated between systems. For example, the data can be employee data (e.g., business data stored in database records for different employees) that can be collected and/or stored in a shared data management system and replicated to a local database system for processing. In some instances, the data management system can be a cloud based or on-premises system that is related to collection, maintenance and management of data such as data related to employees. The shared data management system can be a human resource management system.

Figure 1:
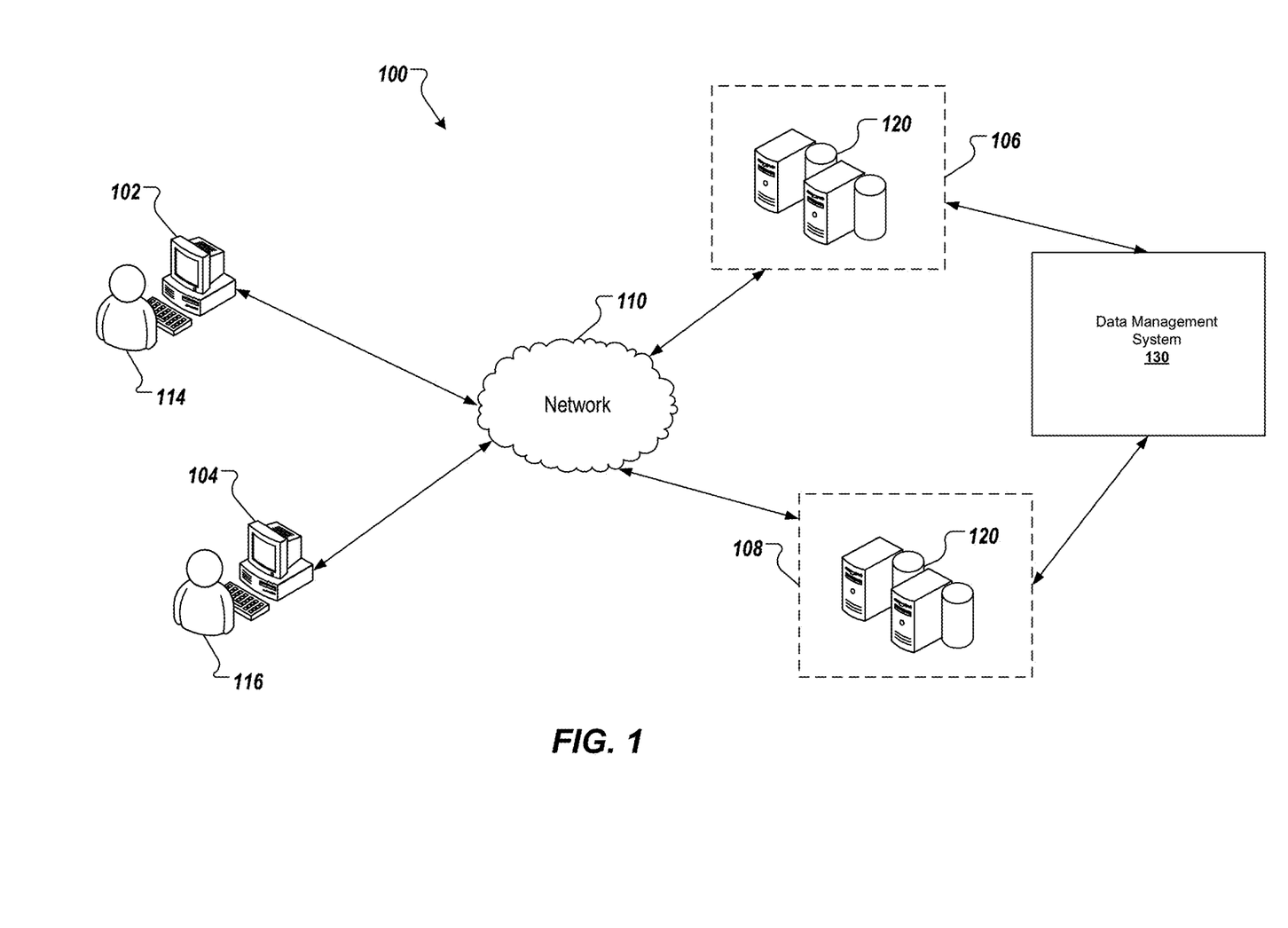
FIG. 1 illustrates an example computer system architecture that can be used to execute implementations of the present disclosure.

FIG. 1 depicts an example architecture 100 in accordance with implementations of the present disclosure. In the depicted example, the example architecture 100 includes a client device 102, a client device 104, a network 110, and a back-end processing environment 106 and a back-end processing environment 108. The back-end processing environment 106 is a computing environment that may be implemented in a cloud environment or in an on-premise environment and include one or more server devices and databases (e.g., processors, memory). In the depicted example, a user 114 interacts with the client device 102, and a user 116 interacts with the client device 104. The architecture 100 includes a shared data management system 130. The shared data management system 130 may be a centralized or distributed system and in some instances may be implemented in a cloud or on-premise environment. The data management system 130 may provide data that can be replicated in part or in full to one or more of the back-end processing environments 106 and 108. Data can be transferred between the data management system 130 and the back-end processing environments 106 and 108 through the network 110 (not shown in FIG. 1) or through some other network or system.

In some examples, the client device 102 and/or the client device 104 can communicate with the back-end processing environment 106 and/or back-end processing environment 108 over the network 110. In some implementations, the back-end processing environment 106 and the back-end processing environment 108 can be considered as two data centers (or availability zones) of one cloud platform. In those instances, the cloud platform can be called a multi-availability zone platform. The data centers can be instantiated at different geographical locations to leverage data distribution, data persistency, and high availability.

The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the back-end processing environment 106 includes at least one server and at least one database 120. In the example of FIG. 1, the back-end processing environment 106 is intended to represent various forms of servers including, but not limited to, a web server, an application server, a proxy server, a network server, and/or a server pool. In general, server systems accept requests for application services and provide such services to any number of client devices (e.g., the client device 102 over the network 110).

In accordance with implementations of the present disclosure, and as noted above, the back-end processing environment 106 can host applications and databases running on a host infrastructure. In some instances, the back-end processing environment 106 can include multiple cluster nodes that can represent physical or virtual machines. A hosted application and/or service can run on virtual machines (VMs) hosted on cloud infrastructure. In some instances, one application and/or service can run as multiple application instances on multiple corresponding VMs, where each instance is running on a corresponding VM. In some instances, a service hosted on the cloud can include service components that execute specific tasks for maintaining performance of the service. Each of the instances of the service may include a corresponding instance of each service component. In some cases, the service components can be associated with the core or central services provided by the cloud platform.

The back-end environment 106 can provide end-user services, which can include, for example, services associated with requests sent through the network 110 from user 114 (or user 116) over device 102 (or device 104). The applications and the databases that are running in the back-end environment 106 can be designed, developed, executed, and maintained in relation to different customers and based on configured accounts that define process execution in relation to the applications and the database.

In some instances, the back-end processing environment 106 may be configured in a multiple availability zone architecture. The back-end processing environment 106 may be configured to include multiple availability zones where one application may include multiple instances running in corresponding multiple availability zones. By executing applications, services, databases, and other examples of entities that can run on cloud platforms in a multiple availability zone setup, high availability for provided services and data is maintained. Maintaining a cloud platform with multiple availability zones supports providing low-latency network connectivity between different instances of applications executed in multiple zones. In some implementation, central components providing core platform services, central customer services, or specialized platform services can be consumed by customer applications that are run in the back-end processing environment 106.

In some instances, the back-end processing environments 106 and/or 108 may host applications, service, databases, other, which are associated with different customers and/or accounts, or with the platform provider, and may be configured to interact in a particular way. In some implementations, hosted applications, services, and databases, can consume services provided by other applications, services, and databases thus forming a process chain and interconnection during process execution. In some instances, a primary function of a database management system 130 is to maintain records.

In some implementations, when data is to be transferred from one system to another, the second system can collect the data in a staging area, which can grow by the number of the business entities (e.g., employees) and the number of time that data is collected for these business entities (e.g., snapshots of the employee data including payload as business data stored in records for the different business entities as employees). For each entity, only one record in the database may need to be considered as the relevant record. For example, for all records for a business entity, only the most recent record would need to be considered as the relevant record (e.g., the record with the latest timestamp) as that record includes the latest data also considered from data in previous records (e.g., the latest record is a snapshot of all the latest business data). If the staging area includes a vast amount of data with millions of records for business entities, which may include multiple records per business entity, processing the whole amount of data at once into the memory (RAM) of the second system can be a cumbersome task. The memory is a limited resource and such operation of reading all records might be impractical and even associated with memory overflowing and downtime of the system.

Figure 2A:
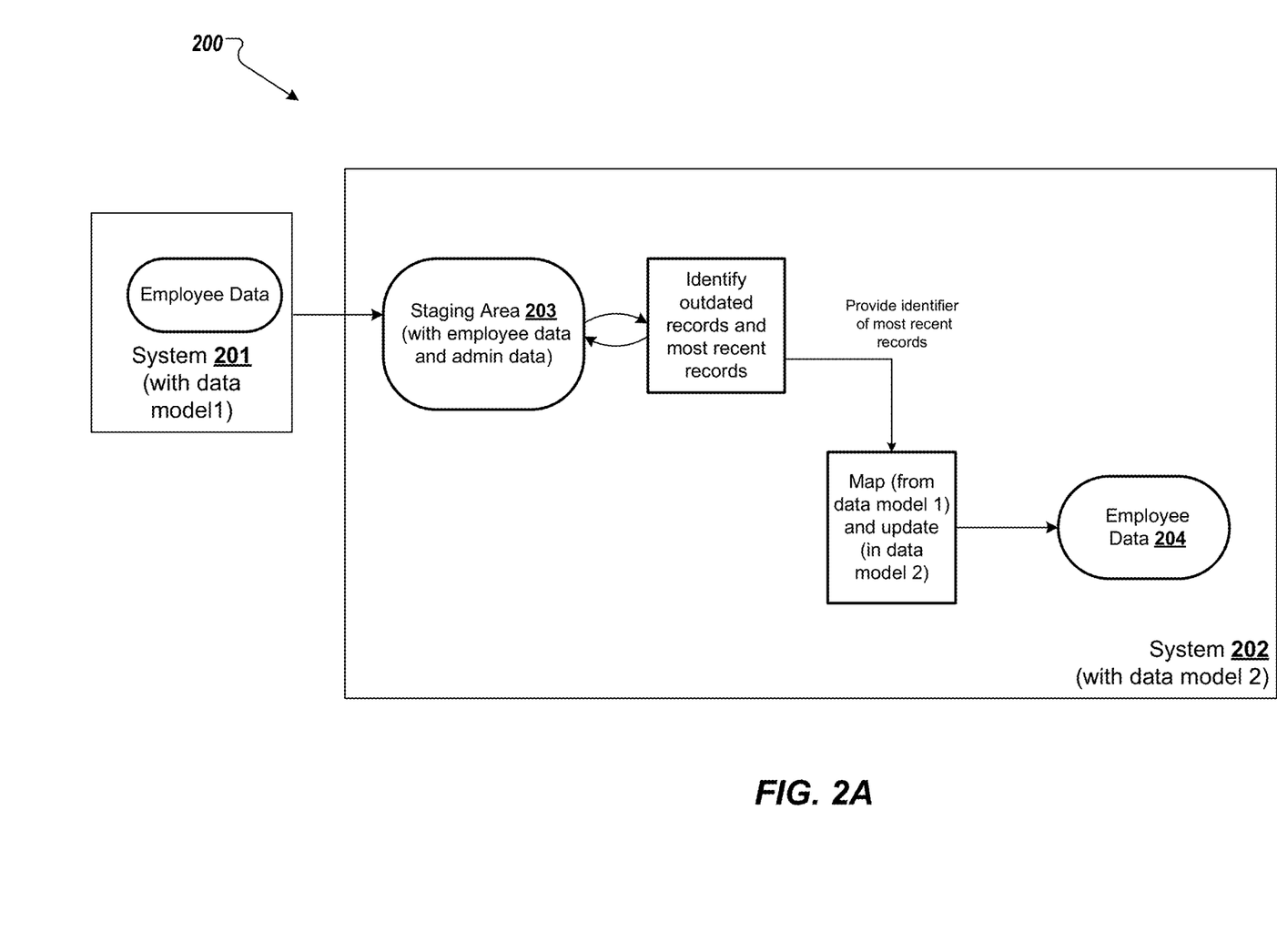
FIG. 2A is a block diagram for an example system environment supporting replication of data between a first system and a second system in accordance with implementations of the present disclosure.

FIG. 2A is a block diagram for an example system environment 200 supporting replication of data between a first system 201 and a second system 202 in accordance with implementations of the present disclosure.

The system 201 can be a shared data management system and the system 202 can be a local database system. The system 201 can store data for business entities such as employees according to a first data model. Data from the first system 201 is transferred into a staging area 203 of the second system 202 as part of a data replication operation. Data can be transferred from the first system 201 to the staging area 203 over several iterations that can be associated with events at the system 201 such as updating of a record associated with a business entity, for example, updating employee data of an employee. In those instances, once employee data for an employee is updated, the staging area 203 can receive a replication of data from the system 201 that includes the modified or updated data for business entities (e.g., full replication of the employee data or partially defined to correspond to the updated portion of the data). The staging area 203 can include employee data and administration data as replication from the 201 that describe the business entities for which data is replicated into the system 202.

The system 202 processes the data at the staging area 203 to determine which data is relevant for storing as employee data 204 and that is up-to-date data. In some instances, if multiple records are stored in the staging area for a single employee, only one record may be relevant for the employee that can correspond to the latest entered record. For example, if an employee position was changed over time, and such data for the changes is transferred to the staging area 203, when the data in the staging area 203 is processed to store relevant data in the employee data 204, only the data record with the latest defined position for the employee may be relevant for storing in the employee data 204. The system 202 includes logic to read all unique identifiers of the employees, for which at least one record needs to be processed. The read identifiers include data that is comparatively smaller than all the data for all records as stored in the staging area 203 because the read list include unique identifiers that occur only once and no additional data is not read for further processing in the memory of the system 202. The read unique identifiers can be read in portions and over iterations until all unique identifiers are processed. When a first identifier is taken from the list, relevant database records for that unique identifier are read from the staging area. The bundle of records for an identifier can be processed and provided to a processing engine or system to determine which record is the one relevant for the replication.

In some instances, after processing a portion of the unique identifier (e.g., a first set of identifiers), an identifier associated with the most recent records of all records for each employee can be provided for further processing, and the other records can be updated with a status "Outdated". The record relevant for the update can be processed based on conversion between the model used for storing data at system 201 to the model used for the data stored at the employee data 204 of system 202.

In some instances, only the identifier of the record relevant for processing can be provided when performing the mapping, so that not all data of the record is read, but rather the logic for the conversion and the mapping can be used to determine which are the relevant fields for obtaining from the staging area 203.

For example, Table 1 below includes example data stored in a staging area such as the staging are 203.

TABLE 1

| Record identifier | PERSON_UID | STATUS | LASTCHANGE_TS | EE_XML_PAYLOAD |
|---|---|---|---|---|
| 123 | 4745 | Open | 20230101_1451 | Data_1 |
| 124 | 4745 | Open | 20230102_1601 | Data_2 |
| 124 | 8974 | Open | 20230102_1601 | Data_3 |
| 078 | 8974 | Pending | 20221231_0943 | Data_4 |

The staging area include data stored in rows, where each row is related to an entry of data for a given employee, where multiple entries can be associated with a single employee as they are associated with respective different modifications associated with that entry.

When the data at the Table 1 is processed, the unique identifiers (Person_UID) of the employees are read, and a list of two identifiers is determined, i.e., 4745 and 8974. Both identifiers can be taken and processed as a portion of the data. It should be appreciated that in an example where the number of unique identifiers (as in the list of two here) in the staging area are above a certain threshold, those identifiers can be taken into portions, where each portion can be processed concurrently. In some instances, defined portions of identifiers can be processed in parallel or sequentially. In the example of Table 1, it can be interpreted that 2 (the number of unique identifiers) is less than a threshold number of identifiers that can be processed in parallel (e.g., configured by default, dynamically determined, or obtained as user/admin input). For the first unique identifier, 4745, two records are read, where those records have unique record identifiers 123 and 124. Each record identifier and a respective Person_UID of each row of Table 1 can be considered as a tuple that is unique for the data stored (Table 1) that is to be processed. In some instances, when the two records are read, it may be possible to first read the data associated with the timestamp of storing these records, as shown in the fourth column (LASTCHANGE_TS) of Table 1. The record identifier that is associated with the record that is the most recent one can be identified. For example, when the records associated with the employee associated with the Person_UID=4745 are processed, it can be determined that the most recent record is the second record, i.e., record identifier 124 (that corresponds to the second row and combines with Person UID="4745" to form a unique identifier for the record) based on an evaluation of the timestamp for the change (fourth column of Table 1). The record with identifier 123 and Person UID="4745" is a record that is the older record, and the status of the record can be updated to "Outdated." The same evaluation can be performed for the two records associated with the employee with unique identifier Person UID="8974". For the employee with unique identifier 8974, it can be determined that the relevant record is 124 (i.e., third row of Table 1). Thus, the identifier 124 can be used to invoke employee data (in the payload).

The unique identifiers 8974 and 4745 of the two employees can be provided to be processed (e.g., in some cases not in the present example, the identifiers can be provided in packages when the number of the identifiers meets a threshold criterion). The identifier of the record in the staging area can be processed for determining data for replication in the database of the second system such as the second system 202.

Figure 2B:
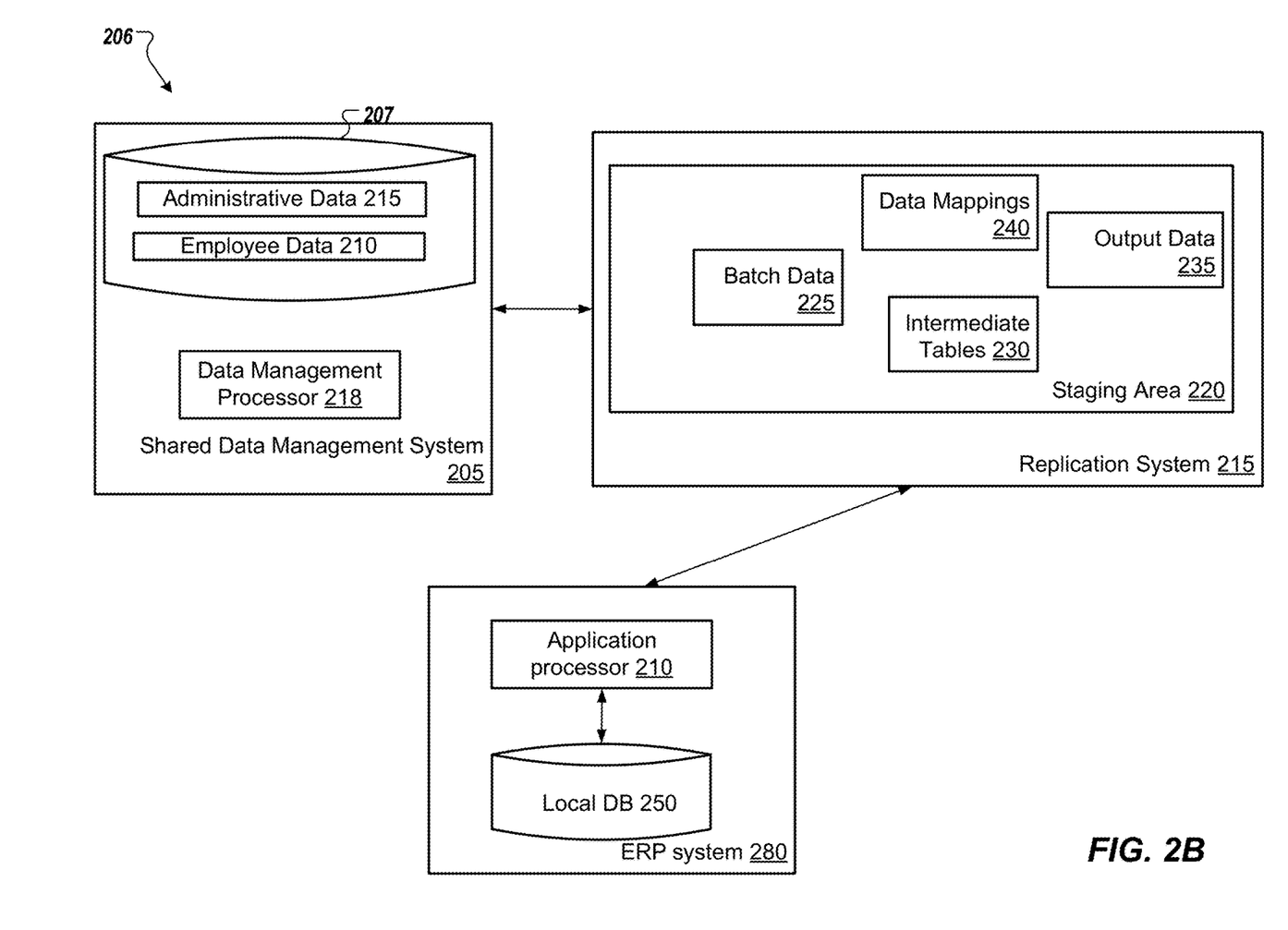
FIG. 2B is a block diagram for an example system environment supporting replication of data between a data management system and a database system in accordance with implementations of the present disclosure.

FIG. 2B is a block diagram for an example system environment 206 supporting replication of data between a shared data management system and a local database system in accordance with implementations of the present disclosure.

In some instances, data from a shared data management system 205 is replicated to a local database system. In this example, the data being replicated is employee data 210 from the shared data management system 205 to the local database system 250. In such an instance, the shared data management system 205 can be a human resource management system that maintains data for employees. The shared data management system 205 can receive interactions from users, such as human resource specialist, who work with the system to provide new data, to modify or update existing data, or to delete existing data, among other examples of data manipulation available for the data stored in the shared data management system 205.

In some instances, the shared data management system 205 stores administrative data 215 in addition to the employee data 210 stored in records for business entities (e.g., employees). In some instances, the shared data management system 205 stores employee data 210 (that can be business data) can also include data for a given organization, such as an employer of employees who are associated with the employee data 210. The administrative data 215 can include data (e.g., timestamp, user ID, etc.) that identified database records storing employee data per business entity. Employee data 210 and administrative data 215 are stored in a database or other data store 207. Data management system 205 also includes a data management processor 218 that receives and processes instructions to create, read, update and delete data in database 207 including employee data 210 and administrative data 215. It should be noted that in a multi-tenancy environment where data management system 205 is shared among a plurality of tenants, the data is segregated and privacy maintained such that tenant A has access to only its employee data 210 and administrative data 215, but has no access to similarly stored data for tenant B.

As noted earlier, when data is replicated from the data management system 205 to a local database 250 in ERP system 280 and if the data is to be read in the RAM memory of the database, the amount of the data can overwhelm the RAM memory.

To address this issue, a replication system 215 can be configured to perform processing of the data that is to be replicated to the local database system 250. In some instances, the replication system 215 can provide a staging area where the data to be replicated from the data management system 205 is first evaluated where the appropriate data is copied to output data 235. After storage in output data 235, the needed data is forwarded to database system 250. For example, according to a data structure for storing entries in the database system 250. The data in the database system 250 can be used by external processes, such as a payroll process. Those processes can be triggered through applications and systems running in the same or a different environment and communicatively coupled to the database system 250 to invoke the data and use it during their execution.

In some instances, at the staging area 220, data can be obtained from the data management system 205, for example, on every occasion that data is updated in the employee data 210. The staging area 220 can periodically obtain data from the data management system 205 and can be configured to push data to be updated in the database system 250 according to an update schedule. The update schedule may correspond to the events when data is received from the data management system 205, or can be different. Thus, the staging area can acquire data from the data management system 205 on several occasions before such data is used for processing and for replication to the database system 250.

In some instances, when the data management system 205 provides data to the replication system 215 (e.g., after an update of employee data 210), the data can include a full state of the records for employees stored in the employee data 210, or can be a defined subset of the records. In some implementations, the replication system 215 can be included in the data management system 205, can be part of a data management system such as an ERP system or a database (e.g., as part of the database system 280), or can run as a stand-alone system, device or a service that is not integrated into either data management system 205 or database system 280.

At a subsequent update of the data in the employee data 210, the shared data management system 205 can provide data to the replication system 215 that includes the full set of the records, the same subset of the records, or another portion of the records from the employee data 210. Thus, it can be possible that after a few times that the data management system 205 provides data to the replication system to the staging area, the staging area can include more than one data record associated with a single employee record (or an identifier that can be uniquely defined for that employee).

In some instances, the data from the data management system 250 is stored at the staging area and can be processed in batches. Multiple batches of data (225) can be defined, where the batches of data can be defined based on determining identifiers included in data records provided by the data management system 205. The determination of batches can correspond to the described determination of sets of records based on identifiers of employees as described in relation to FIG. 4B.

Figure 3:
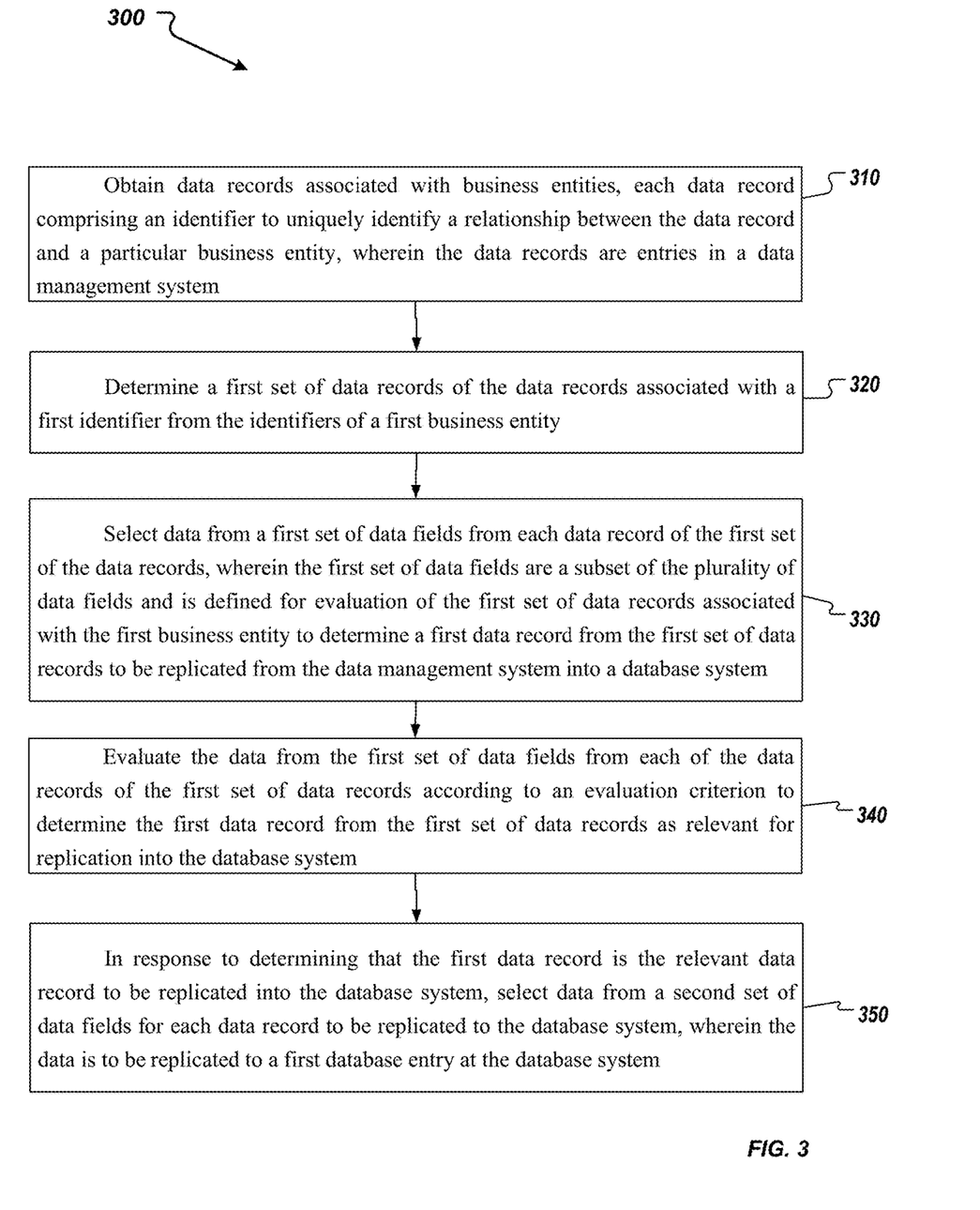
FIG. 3 is a flowchart for an example method for data replication in accordance with implementations of the present disclosure.

In some instances, a first set of data can be obtained and processed as described in method 300 of FIG. 3. The data can be processed to determine a reduced set of data, for example intermediate tables 230 that include data that is relevant for the processing to determine which data records are to be used for the replication (e.g., most recent records are relevant for the update). Based on the processing, output data 235 can be defined and provided to the database system 250.

FIG. 3 is a flowchart for an example method 300 for data replication in accordance with implementations of the present disclosure. The example method 300 can be executed at a replication system, such as the replication system 215 of FIG. 2B.

In some implementations, the example method 300 can be executed within a database system including a replication system 215 that stores obtained data from a data management system at a staging area and processes the data to identify relevant data to be updated or provided to a database system. In some instances, the replication system 215 can be a system that is in communication with the database system but running outside of the database system. In some more instances, the replication system 215 can be part of another system, such as a database where data is to be replicated. For example, the replication system 215 can be a component of a designated system that obtains data for made changes at the database system. The data from the data management system that is to be replicated can be mapped to data in the data management system, for example, based on a pre-configured mapping of identifiers of business entities in the data management system and entries in the database system. In some embodiments, the pre-configured mappings of identifiers can be stored in a data mappings 240 module at the staging area. In some instances, data associated with a business entity that can be defined as a data object in the data management system can be updated as a database entry in the database system based on matching an identifier of the data object with an identifier of the database entry. For example, the identifiers that are matched can be different identifiers indicative of the same object, such as an employee of a customer for whom data is stored in both systems.

At 310, data from data records associated with business entities is obtained. The data records are associated with business entries in a data management system. For example, an employee of an organization can be defined as a data object in a data management system, where a data record can include data for that business entity as a data object stored in the data management system together with data for different properties of the data object (e.g., in data fields defined for the object). If data for a business entity is updated at the data management system, multiple data records can be created and stored. These multiple data records would be associated with a single business entity (or data object). In some embodiments, data for business entities can be obtained, where the data can include one or more data records for each business entity. In some instances, the data is for employees that are identified as data objects in a data management system, such as the data management system 205 of FIG. 2B. Each data record of the data records can include a respective identifier to uniquely identify a relationship between the data record and a business entity.

In some instances, at least two data records are associated with a single business entity. In some instances, a plurality of data fields is defined for each record of the data records. For example, the data fields can be defined for properties of the data records such as identification number, name, address, position, department, and marital status, among other examples of properties associated with an employee profile.

In some instances, the data records can be obtained based on an obtained file with data related to multiple business entities (e.g., employees of a company) that is processed and split into separate records for different entities. These data records can conform to a data dictionary structure such as the structure for storing data in the database table 400 of FIG. 4A. In some instances, the data records can be obtained multiple times from a system, where each obtaining can be associated with a made update for data related to at least one business entity (and respective data record).

In some instances, the data records can be obtained in form of a single XML file including multiple data records from the data management system. In some instances, the file can be received, where the receipt can trigger processing of the file. In some instances, when new data is stored in the data management system, such data storage can trigger an event that is associated with the initiating of data processing for performing data replication of data from the data management system to the database system. The file can be parsed, for example, at a staging area for processing the data. For example, updates done in a particular system can be provided as included in a file, where the file may be parsed to read each or some of the data records and to process the data. For example, the parsing can be relevant when converting data from the file and placing the data into tables in a database (e.g., where we replicate, or where we stage).

For example, the staging area can be a different space outside of the database system or it can be a storage space within the database system, where data that is to be processed is stored and evaluated to determine the portion of the data (e.g., data associated with a data field from the data records that is defined as relevant for the evaluation) that is to be stored in the database system (e.g., update an entry at the database, add a new entry at the database, other).

At 320, a first set of data records of the data records associated with a first identifier from the identifiers of a first business entity is determined.

In some instances, each record of the first set of data records can be associated with an identifier(s) and/or other data fields. These data fields can be used for evaluation of data related to the data records to determine which data is relevant for replication. For example, the identifiers can be used to determine a portion of the data (e.g., data fields from the data records associated with a given field matching an identifier) that can be evaluated to identify a data record to be copied. In some instances, it can be determined based on evaluating a particular data field or portion of a data record whether the data record or a portion of the data of the data record is to be replicated. This can be done without processing other data from the data records. In some cases, the identifier data from the data records can be extracted. As an example, many companies assign a unique employee identification number to each employee or contractor. This employee identification number would be one portion or data field in a data record associated with that employee. Each employee identification number can be used as a key to process other data in the data record associated with that employee with the employee identification number. Once the identifiers have been extracted, the list with all identifiers for each record can be sorted and filtered to eliminate repetitive or duplicate identifiers. Once the duplicate identifiers have been removed, at least some of the set of identifiers has a one-to-many relationship with data records, and therefore not many-to-one, such that remaining identifiers is a list of unique identifiers. In some cases, some of the identifiers has one-to-one relationships to data records when there is only a single record associated with the given identifier. In such case, even if two or more data records have the same identifier, that identifier will be present in the list only once.

At 330, data from a first set of data fields from each data record of the first set of the data records is selected. The first set of data fields are a subset of the plurality of data fields and is defined for evaluation of the first set of data records associated with the first business entity to determine a first data record from the first set of data records to be replicated from the data management system into a database system.

In some instances, a portion of data, from a first set of the data records, associated with an identifier from the set of identifiers can be determined and selected. The portion of the data includes data that is to be replicated into a database system. In some instances, the data records include records that are associated with the same, first identifier from the set of identifiers. Those data records that include the first identifier are used to obtain a portion of the data for those data records. In some instances, the portion of the data can be business data (e.g., employee name, employee position, location, department, etc.) that is data to be replicated from the data management system to the database system.

At 340, the data from the first set of data fields from each of the data records of the first set of data records is evaluated according to an evaluation criterion to determine the first data record from the first set of data records as relevant for replication into the database system.

The determination of the first record from the set can be based on evaluation of a portion of the data from the first set of data records. For example, the determination can be based on determining that the first data record has the most recent time stamp. In some other examples, the determination can be based on determining which data record is the most recently stored record or the most relevant stored record at the data management system. Such determination can be performed based on evaluating data properties for the record that can identify the relevancy and timeliness of the stored records. For example, data records can be inherently stored with an understanding of their hierarchical relationship and/or an identification of the order in which they were stored. Thus, a data record comprising data identifying the latest stored record can be used to determine that the respective record is the one to meet the update criteria (in that case, this would be the latest stored record).

At 350, in response to determining that the first data record is the relevant data record to be replicated into the database system, data from a second set of data fields for each data record is selected to be replicated to the database system. The data is to be replicated to a first database entry at the database system.

In some instances, the first set of data records that are determined to include the first identifier can be categorized once they are processed at operations 330 to 350. The first set of data records can be categorized with a final status. The first data record that is determined to have the most recent time stamp can be categorized with a successful status and the rest of the data records in the first set can be categorized with an outdated status.

In some instances, a deletion of data records that are categorized with final statuses (either successful or outdated) can be performed when a deletion criterion is met. The deletion criterion can define a threshold period of time that needs to have passed since the categorization of the data records. For example, a last changed timestamp for a record in the database (as stored for data records in the database) can be used to determine whether a threshold period of time had passed. In some instances, where a record has a final status (either successful or outdated) and the record has remained in this status for a threshold period of time, the record can be deleted to free storage space.

Figure 4A:
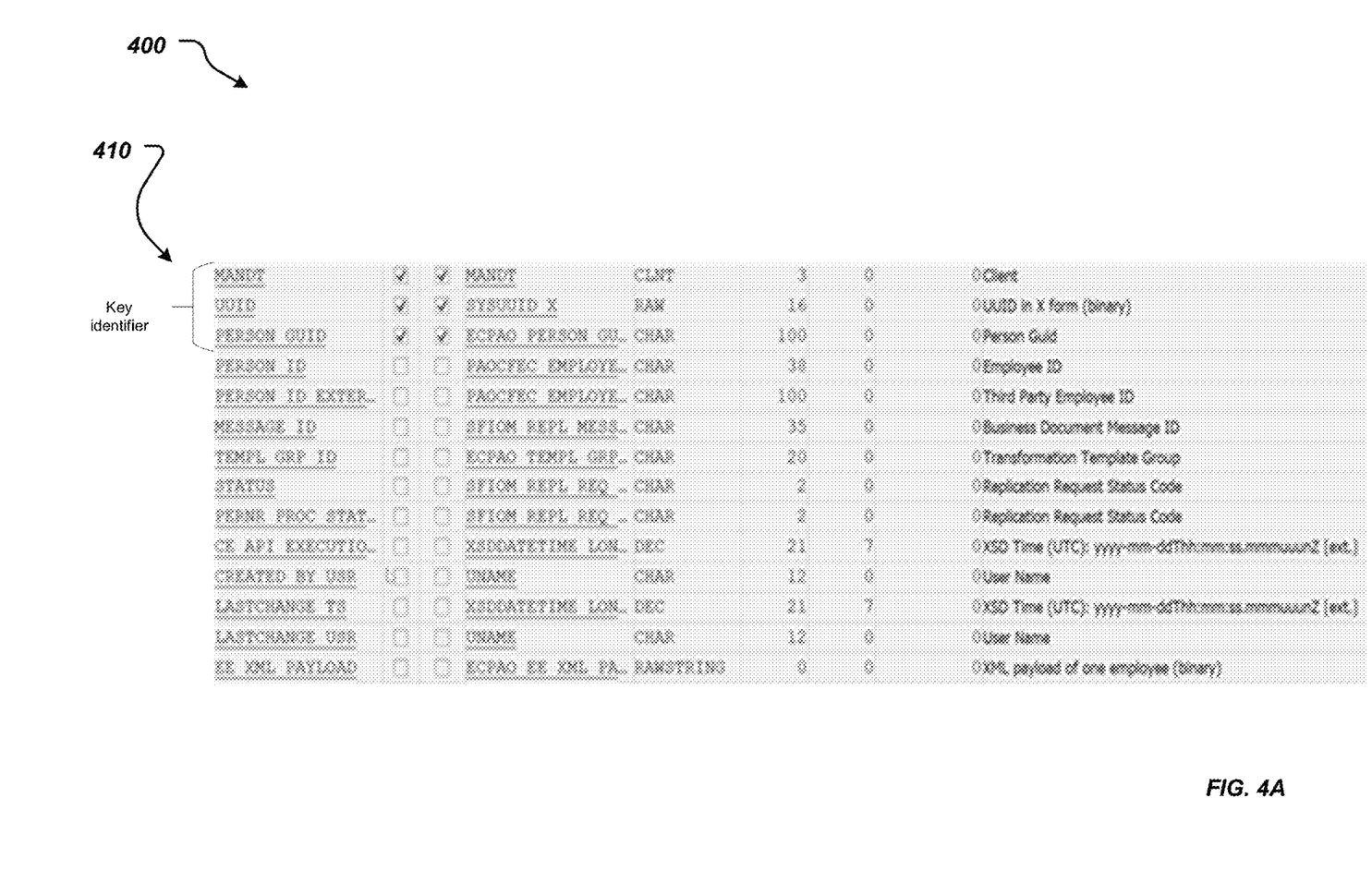
FIG. 4A is an example database table for storing data from a data management system in a staging area before replicating in a database system in accordance with implementations of the present disclosure.

FIG. 4A is an example database table 400 for storing data from a data management system in a staging area before replicating to a database system in accordance with implementations of the present disclosure.

The database table 400 includes properties for the data that is obtained and stored from a data management system, such as the data management system 205 of FIG. 2B or the system 201 of FIG. 2A. The database table 400 can be used when parsing data obtained from the data management system, for example, in form of an XML file that includes the data records for business entities stored in the data management system.

The database table 400 includes identifiers related to the entities, such as employees as discussed in relation to FIG. 2A. The identifiers can include an identifier for a client that can be an owner of the data, identifier for the record of data in the system, and an identifier of the respective business entity (or employee). These three identifiers can form a key identifier 410. In some instances, the key can be defined by the UUID that is an identifier for the record and the Person GUID as identifier that uniquely identifiers the business entity that is an employee, as shown on FIG. 4A. Further identifiers can be defined in the database related to properties of the data stored, including timestamps related to records as well as associated users for making the change. The database table 400 defines properties that include identifiers that can be considered as administrative data as well as data payload (property EE_XML_PAYLOAD) that is business data stored for each business entity (or employee).

Figure 4B:
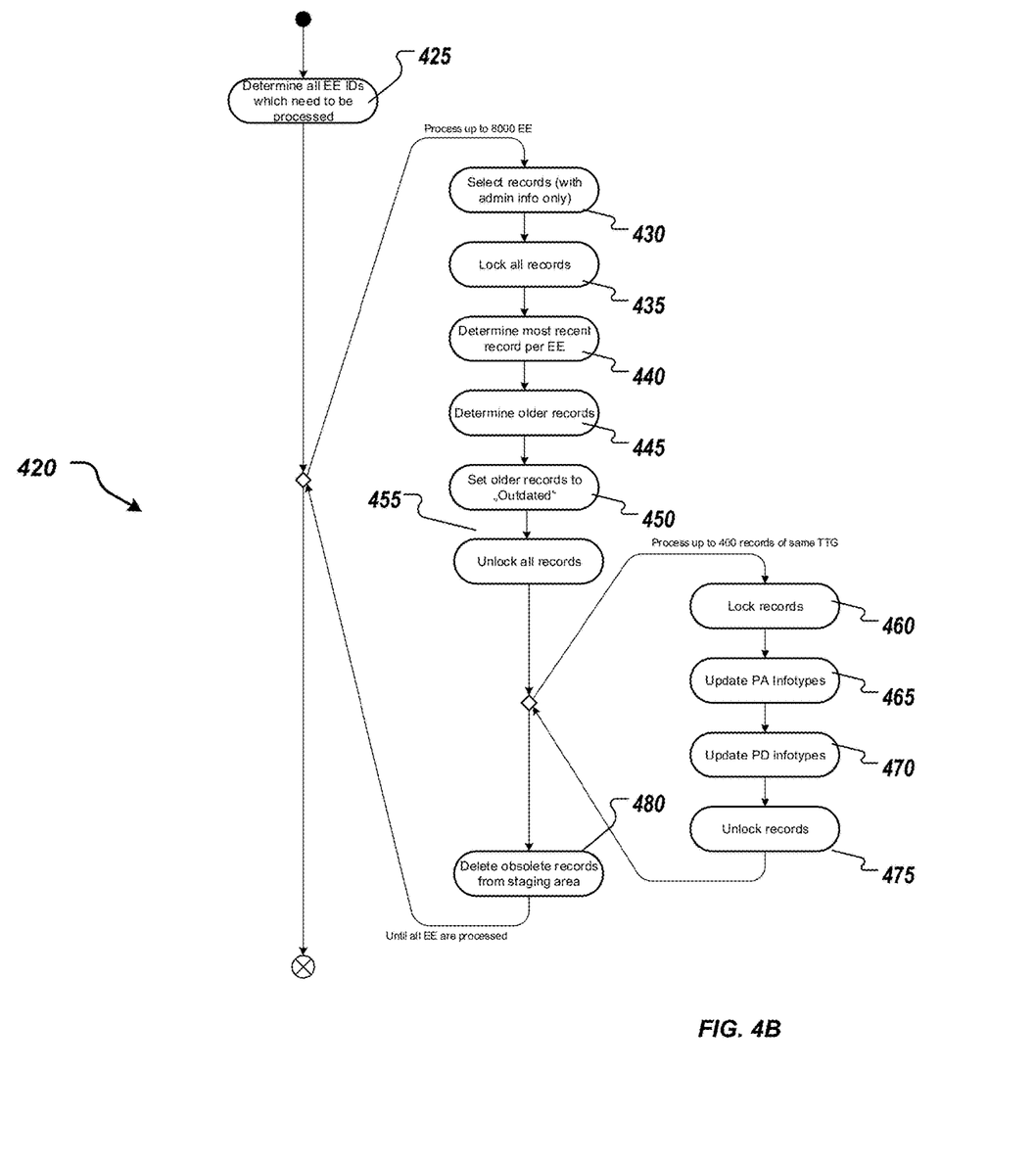
FIG. 4B is an example method for processing data stored in a staging area to determine a portion of the data to be replicated at a matching entry in a database system in accordance with implementations of the present disclosure.

FIG. 4B is an example method 420 for processing data stored in a staging area to determine a portion of the data to be replicated to a matching entry in a database system in accordance with implementations of the present disclosure.

At 425, based on data obtained from a data management system (e.g., the data management system 205 of FIG. 2B), identifiers of business entities (or data objects) can be determined. For example, the identifiers can be identifiers corresponding to employee record stored in the data management system. In some instances, the determined identifiers at 425 can be based on obtained data from a recent update in the data management system including new data in the records for the employee objects. In some instances, the determined identifiers at 425 can be obtained based on data that has been received from the data management system at least two times based on two different updating operations performed in the data management system.

In some instances, when an update event for data is performed in the data management system, the data is stored in the data management system is also provided for replication to a database system, as described in relation to FIGS. 2B and 3. The pushing of data from the data management system to a staging area, such as the staging area 220 of FIG. 2B, can be performed on each occasion of an update in the data management system. Once the staging area obtains data based on an update, that obtained data is data for a first set of business entities stored as data objects in the data management system, where each object is associated with a unique identifier for an employee. When a subsequent update operation is performed in the data management system, the staging area can obtain a subsequent set of data for a second set of data objects, where the second set of objects can at least partially correspond to the first set of data objects. For example, at the first update, data for data object A can be updated, and at the second update, the data for that object A can be updated again. In that example, the staging area will obtain data for object A two times, where that data may be different data. In some examples, a subsequent update operation can include a new object (e.g., a new employee entry) that was not present after the first update operation, and in those examples, only one object will be associated with a single employee object.

At 430, a portion of the determined identifiers at the 425 can be selected, and can be used to select portions of the data in respective data records for replication. For example, an identifier from the determined identifiers can be used to determine two or more data records associated with the identifiers, where data from those data records can be evaluated according to an evaluation criterion to determine which one data record is the one for replication (e.g., the record that is the newest such as the one that is associated with the latest time stamp). When a data record for replication is determined as relevant, a portion of the data from the data record may be only relevant replicating in the database system. For example, not all but a portion of the data (e.g., data associated with a subset of the data fields defined for data records at the database management system) that is stored in the data management system can be data that is needed or relevant for providing to the database system. Such definition of which type of data is relevant for the replication can be configured, for example, based on user input.

In some implementations, the selection of records can be performed based on a configuration defining a number of records to be used for processing at one time. Such definition of the number of records can be obtained dynamically, or can be defined based on a default configuration taking into account computing processing capacity of the hardware and software used for executing the method 420.

In some instances, the operations of selecting of records and identifying those records that are to be replicated at the database system, as presented at 430 to 475, can be performed in a substantially similar manner as described in relation to FIGS. 2A, 2B, and 3, and as further described in the examples and claims in the present application.

At 435, the data records associated with the selected portion of data can be locked.

At 440, most recent records for each identifier associated with a respective employee record can be determined, and at 445, the older records for each identifier can also be determined. At 450, the older records can be categorized as outdated, and the most recent record can be categorized as up-to-date. Other statuses or categories can be used in a similar manner. Categories are added to records to identify their status related to the data replication. For example, a status in a final state can be defined, which means that those data records have been processed to determine which data should be used for replication to the database system (e.g., where the replication is from at least some of the data records identifier with a final state, and where all those data records are processed). At 455, the records that were selected at 430 and locked at 435 can be unlocked. The older records are in a final status categorized as outdated. The most recent record can be with a pending or open status.

After 455, the open records from the selected records 430 are processed to be used for updating database entries in the database system. In some instances, a set of records that are in a final state are used for updating data in the database system. In some instances, the updating can be performed in batches defined from the records in a final state, for example, a default number of records can be defined for each batch. When a batch of records is processed for updating, the relevant records that are the most recent records (in an open status) can be locked and unlocked (see 460 and 475). Once the most recent records are locked, a first batch of records is used to update database entries such as administrative data types (at 465) and development position data types (at 470). Once the payload of the records is successfully processed, the status of these records can be changed to a final status categorized as successful.

In some instances, locking of the records, as described at 435 and 460, can be omitted and optionally restrictions to access to the data during the processing and updating can be provided on general system level. For example, general access to data that is under processing can be restricted for a set of users, or to users of a particular user role.

At 480, the records can be determined to have a final state when they are processed and it is determine which one of the records is to be replicated and which one is not relevant for the replication. For example, the final state can be selected from the group of successful for those records that are used for replication or outdated for those records that are only processed but not determined as relevant for replication after being processed. The determination of a final state can be used to determine relevant records to be used for updating and relevant records to be deleted. The deletion can be performed according to a predefined deletion rule, e.g., delete records with a final status after a threshold amount of time that the record has been set to the final status. In such cases, after data is used to be replicated to the database system, the data may be kept for the threshold amount of time in the staging area and used to verify performance of an update, or used as a back-up option in case of failures or issues during the update steps at 465 and 470.

In accordance with implementations of the present disclosure, records in a final state may not be needed at the staging area. However, for investigation of error situations it can be useful to store them for a threshold period of time and have them available for recovery procedures in case of failures. For example, records in a state final can be deleted if the last change time stamp is older than 30 days from today during the processing. This can reduce the size of the staging area database table. It can also ensure that at least one record per replicated data record remains in the table in the staging area.

Figure 5:
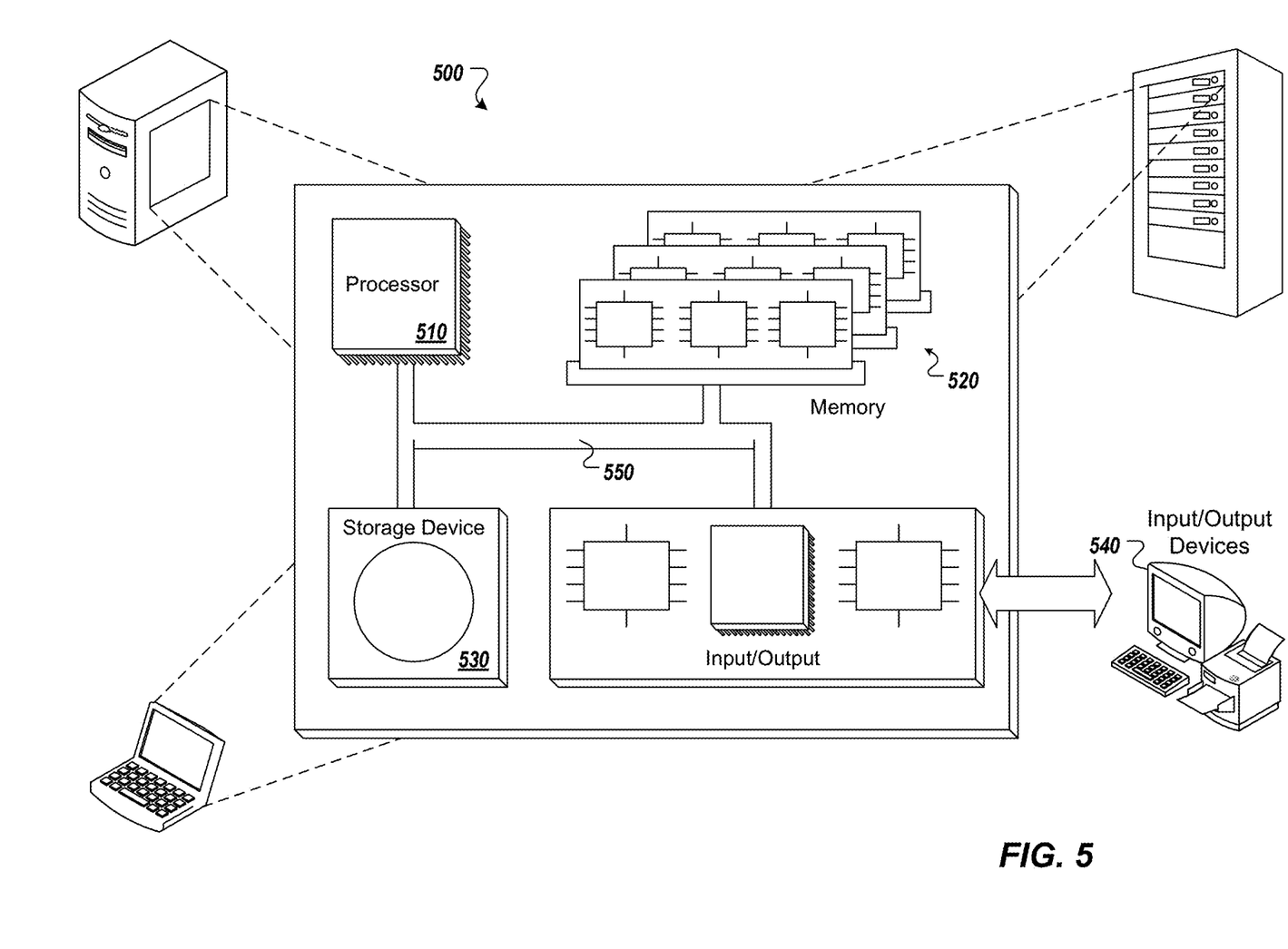
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, and 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of these. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory, including, by way of example, semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or which includes a middleware component, such as an application server or an Internet server, or which includes a front-end component, such as a client computer having a graphical user interface or an Internet browser, or any combination of these. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

EXAMPLES

Although the present application is defined in the attached claims, it should be understood that the present invention can also be (alternatively) defined in accordance with the following examples:

Example 1

A computer-implemented method, the method comprising:
  obtaining data from data records associated with data objects, the data records comprising an identifier to uniquely identify a relationship between a data record and a data object, wherein the data records are associated with entries in a data management system;
  determining a set of identifiers based on the data records, wherein each identifier from the set of the identifiers is included only once in the set of identifiers;
  selecting a portion of data from a first set of the data records associated with a first identifier from the set of identifiers, wherein the selected portion of the data includes data that is to be replicated into a database system; and
  in response to determining that a first data record meets an update criterion based on evaluating the portion of the data from the first set of data records, determining a first portion of data associated with the first data record from the portion of the data that is to be replicated to the database system, wherein the first portion of data is to be replicated to a first database entry at the database system, and wherein the first identifier of the first data record matches an entry identifier of the first database entry in the database system.

Example 2

The method of Example 1, wherein the obtained data includes iterative obtaining of data at multiple instances in response to multiple updates performed in the data management system, wherein at each iteration, a current state of the data records in the data management system is obtained.

Example 3

The method of Example 2, comprising:
  periodically receiving files with data for the data records from the data management system, wherein optionally, the receiving of the file is triggered based on an event associated with storing new data in the data management system;
  in response to receiving a file, parsing the file to identify the data records as separate records to be processed for identifying data to be replicated in the database system;
  in response to parsing the received files, storing data records as obtained through the parsing, wherein at least two data records are associated with one common identifier associated with the same data object in the data management system.

Example 4

The method of Example 3, comprising:
  providing data to be replicated to the database system according to an update schedule, wherein the data that is to be replicated is from data that has been obtained from at least two files received from the data management system.

Example 5

The method of Example 2, wherein the set of identifiers determined based on the data records includes at least one identifier which is associated with at least two data records from the obtained data, where the at least two records are associated with two sets of data obtained in two iterations.

Example 6

The method of any one of the preceding examples, wherein the update criterion for determining the first data record includes determining that the first data record has a most recent time stamp as stored in the portion of the data from the first set of data records.

Example 7

The method of any one of the preceding Examples, wherein the update criterion for determining the first data record includes determining that the first data record is the most recent record stored in the portion of the data from the first set of data records.

Example 8

The method of any one of the preceding Examples, comprising:
  categorizing the first set of data records with a final status, wherein the first data record is associated with a successful status and the rest of the data records are to be associated with an outdated status.

Example 9

The method of Example 8, comprising:
performing a deletion of data records from the obtained data records that are categorized with a final status based on meeting a deletion criterion, wherein the deletion criterion defines a threshold period of time that needs to have passed since the categorization of the data records to allow the deletion.

Example 10

The method of any one of the preceding Examples, wherein the obtained data is stored at a staging area within a replication processor.

Example 11

The method of any one of the preceding Examples, wherein the obtained data is stored in a database area within the database system based on pre-processing of obtained data from the data management system.

Example 12

The method of any one of the preceding Examples, wherein the data from the data records is employee data, wherein the data records are identified by a unique key, the unique key comprising an identifier of an entity associated with the data management system, an identifier of the system associated with collecting or storing the data records, and a unique identifier of an employee.

Example 13

The method of any one of the preceding Examples, wherein the data management system is a human resource system storing and managing data for employees of an entity such as a customer, wherein the data management system is executed at multiple instances distributed at different physical locations and interconnected to maintain a shared data storage for the entity.

Example 14

A non-transitory, computer-readable medium coupled to one or more processors and having instructions stored thereon which, when executed by one or more processors, cause the one or more processors to perform operations according to the methods of any one of Examples 1 to 13.

Example 15

A system comprising
a computing device; and
a computer-readable storage device coupled to the computing device and having instructions stored thereon which, when executed by the computing device, cause the computing device to perform operations according to the methods of any one of Examples 1 to 13.

Example 16

A computer-implemented method, the method comprising:
  periodically receiving files with data for data records from a data management system;
  in response to receiving each file, parsing each file to identify the data records as separate records to be processed for identifying data to be replicated to a database system;
  in response to parsing the received files, storing data records as obtained through the parsing at a staging area;
  obtaining a set of identifiers from the stored data records;
  selecting a set of identifiers for batch processing;
  selecting a portion of data from the stored data records that includes a set of data records comprising respective identifiers from the set of identifiers, wherein the portion of data is to be used for replication of the data into one or more database entries in the database system; and
  processing the portion of data to determine data to be replicated to the database system,

Example 17

The method of Example 16, wherein at least two data records are associated with one common identifier associated with the same data object in the data management system.

Example 18

The method of Example 16, or Example 17 wherein the receiving of the file is triggered based on an event associated with storing new data in the data management system.

Example 19

The method of any one of Examples 16 to 18, wherein processing the portion of data comprises:
  determining a first portion of data associated with a first data record from the portion of the data that is to be replicated to the database system, wherein the first portion of data is to be replicated to a first database entry at the database system, and wherein a first identifier of the first data record matches an entry identifier of the first database entry in the database system.

Example 20

A non-transitory, computer-readable medium coupled to one or more processors and having instructions stored thereon which, when executed by the one or more processors, cause the one or more processors to perform operations according to the methods of any one of Examples 16 to 19.

Example 21

A system comprising
a computing device; and
a computer-readable storage device coupled to the computing device and having instructions stored thereon which, when executed by the computing device, cause the computing device to perform operations according to the methods of any one of Examples 16 to 19.

What is claimed is:

1. A computer-implemented method, the method comprising:
    obtaining a plurality of data records associated with a plurality of business entities at a batch database of a staging area of a replication system by copying the plurality of data records from a data management system into the batch database, wherein each data record comprises an identifier to uniquely identify a relationship between the respective data record and a particular business entity, wherein at least two data records are associated with a single business entity of the plurality of business entities, and wherein a plurality of data fields is defined for each record of the plurality of data records;
    identifying a first set of the plurality of data records of the data records, wherein each record of the first set of the plurality of data records is associated with a first identifier of a first business entity;
    copying data from a first data field from each data record of the first set of the data records into intermediate tables in the staging area of the replication system;
    evaluating the data from the first data that is copied in the intermediate tables according to an evaluation criterion;
    in response to evaluating the data in the intermediate tables, determining a first data record from the first set of the plurality of data records as relevant for replication into a database system of a local system; and
    in response to determining that the first data record is the relevant data record to be replicated into the database system of the local system, copying data from a second set of data fields from the first data record into a first database entry at the database system of the local system, wherein the first database entry is associated with the first business entity.

2. The method of claim 1, wherein evaluating the data from the first data field that is copied in the intermediate tables comprises:
    determining the evaluation criterion to determine data relevant for replication;
    determining that the first data record from the first set of the plurality of data records is relevant for replication into the database system of the local system, wherein the determining comprises:
        comparing a first identifier from the first data field from the first data record and a first identifier from the first data field from for a second data record, the second data record being from the first set of the plurality of data records,
    wherein determining that the first data record from the first set of the plurality of records is relevant for the replication comprises:
        determining that the first identifier from the first data record is identical to the first identifier from the second data records;
        comparing a second identifier from a second data field from the first data record to a second identifier from the second data field from the second data record to determine that the second identifier from the second data field from the first data record is greater than the second identifier, wherein the second data field is identified in a rule part of the evaluation criterion to determine the first data record as relevant for replication; and
    in response to determining that the second identifier from the first data record is greater than the second identifier from the second data record, copying the data from the second set of data fields from the first data record into the database system of the local system and not copying data from the second data record into the database system of the local system.

3. The method of claim 1, wherein the obtained data includes iterative obtaining of data as multiple replication operations in response to multiple corresponding updates performed in the data management system, wherein at each iteration, a current state of at least a portion of the data records in the data management system is obtained by copying at least the portion of the data records into the batch database.

4. The method of claim 3, comprising:
    periodically receiving files with data for the data records from the data management system, wherein receiving the file is triggered based on an event associated with storing new data in the data management system;
    in response to receiving a file of the files, parsing the file to identify data records as separate records to be processed for identifying data to be replicated in the database system; and
    in response to parsing the received files, storing data records as obtained through the parsing, wherein at least two data records are associated with one common identifier associated with the same data object in the data management system.

5. The method of claim 3, comprising:
    providing data to be replicated to the database system according to an update schedule, wherein the data that is to be replicated is from data that has been obtained from at least two files received from the data management system.

6. The method of claim 1, wherein evaluating the data from the first data field that is copied in the intermediate tables according to the evaluation criterion comprises determining the first data record as relevant for the replication by determining that the first data record has a most recent time stamp in the first data field compared to other time stamps in the first data fields of other data records as stored in the intermediate tables in the staging area of the replication system.

7. The method of claim 1, wherein the data management system is a human resource system storing and managing data for employees as the plurality of business entities, wherein the data management system is executed at multiple instances distributed at different physical locations and interconnected to maintain a shared data storage for the business entities.

8. A non-transitory, computer-readable medium coupled to one or more processors and having instructions stored thereon which, when executed by one or more processors, cause the one or more processors to perform operations comprising:
    obtaining a plurality of data records associated with a plurality of business entities at a batch database of a staging area of a replication system by copying the plurality of data records from a data management system into the batch database, wherein each data record comprises an identifier to uniquely identify a relationship between the respective data record and a particular business entity, wherein at least two data records are associated with a single business entity of the plurality of business entities, and wherein a plurality of data fields is defined for each record of the plurality of data records;

identifying a first set of the plurality of data records of the data records, wherein each record of the first set of the plurality of data records is associated with a first identifier of a first business entity;

copying data from a first data field from each data record of the first set of the data records into intermediate tables in the staging area of the replication system;

evaluating the data from the first data field that is copied in the intermediate tables according to an evaluation criterion;

in response to evaluating the data in the intermediate tables, determining a first data record from the first set of the plurality of data records as relevant for replication into a database system of a local system; and in response to determining that the first data record is the relevant data record to be replicated into the database system of the local system, copying data from a second set of data fields from the first data record into a first database entry at the database system of the local system, wherein the first database entry is associated with the first business entity.

9. The non-transitory, computer-readable medium of claim 8, wherein evaluating the data from the first data field that is copied in the intermediate tables comprises:

determining the evaluation criterion to determine data relevant for replication;

determining that the first data record from the first set of the plurality of data records is relevant for replication into the database system of the local system, wherein the determining comprises:

comparing a first identifier from the first data field from the first data record and a first identifier from the first data field from for a second data record, the second data record being from the first set of the plurality of data records, wherein determining that the first data record from the first set of the plurality of records is relevant for the replication comprises:

determining that the first identifier from the first data record is identical to the first identifier from the second data records;

comparing a second identifier from a second data field from the first data record to a second identifier from the second data field from the second data record to determine that the second identifier from the second data field from the first data record is greater than the second identifier, wherein the second data field is identified in a rule part of the evaluation criterion to determine the first data record as relevant for replication; and in response to determining that the second identifier from the first data record is greater than the second identifier from the second data record, copying the data from the second set of data fields from the first data record into the database system of the local system and not copying data from the second data record into the database system of the local system.

10. The non-transitory, computer-readable medium of claim 8, wherein the obtained data includes iterative obtaining of data as multiple replication operations in response to multiple corresponding updates performed in the data management system, wherein at each iteration, a current state of at least a portion of the data records in the data management system is obtained by copying at least the portion of the data records into the batch database.

11. The non-transitory, computer-readable medium of claim 10, comprising:

periodically receiving files with data for the data records from the data management system, wherein receiving the file is triggered based on an event associated with storing new data in the data management system;

in response to receiving a file of the files, parsing the file to identify data records as separate records to be processed for identifying data to be replicated in the database system; and in response to parsing the received files, storing data records as obtained through the parsing, wherein at least two data records are associated with one common identifier associated with the same data object in the data management system.

12. The non-transitory, computer-readable medium of claim 10, comprising:

providing data to be replicated to the database system according to an update schedule, wherein the data that is to be replicated is from data that has been obtained from at least two files received from the data management system.

13. The non-transitory, computer-readable medium of claim 8, wherein evaluating the data from the first data field that is copied in the intermediate tables according to the evaluation criterion comprises determining the first data record as relevant for the replication by determining that the first data record has a most recent time stamp in the first data field compared to other time stamps in the first data fields of other data records as stored in the intermediate tables in the staging area of the replication system.

14. A system comprising:

a computing device; and a computer-readable storage device coupled to the computing device and having instructions stored thereon which, when executed by the computing device, cause the computing device to perform operations comprising:

obtaining a plurality of data records associated with a plurality of business entities at a batch database of a staging area of a replication system by copying the plurality of data records from a data management system into the batch database, wherein each data record comprises an identifier to uniquely identify a relationship between the respective data record and a particular business entity, wherein at least two data records are associated with a single business entity of the plurality of business entities, and wherein a plurality of data fields is defined for each record of the plurality of data records;

identifying a first set of the plurality of data records of the data records, wherein each record of the first set of the plurality of data records is associated with a first identifier of a first business entity;

copying data from a first data field from each data record of the first set of the data records into intermediate tables in the staging area of the replication system;

evaluating the data from the first data field that is copied in the intermediate tables according to an evaluation criterion;

in response to evaluating the data in the intermediate tables, determining a first data record from the first set of the plurality of data records as relevant for replication into a database system of a local system; and in response to determining that the first data record is the relevant data record to be replicated into the database system of the local system, copying data from a second set of data fields from the first data record into a first database entry at the database system of the local system, wherein the first database entry is associated with the first business entity.

15. The system of claim 14, wherein evaluating the data from the first data field that is copied in the intermediate tables comprises:
   determining the evaluation criterion to determine data relevant for replication;
   determining that the first data record from the first set of the plurality of data records is relevant for replication into the database system of the local system, wherein the determining comprises:
      comparing a first identifier from the first data field from the first data record and a first identifier from the first data field from for a second data record, the second data record being from the first set of the plurality of data records,
      wherein determining that the first data record from the first set of the plurality of records is relevant for the replication comprises:
         determining that the first identifier from the first data record is identical to the first identifier from the second data records;
         comparing a second identifier from a second data field from the first data record to a second identifier from the second data field from the second data record to determine that the second identifier from the second data field from the first data record is greater than the second identifier, wherein the second data field is identified in a rule part of the evaluation criterion to determine the first data record as relevant for replication; and
         in response to determining that the second identifier from the first data record is greater than the second identifier from the second data record, copying the data from the second set of data fields from the first data record into the database system of the local system and not copying data from the second data record into the database system of the local system.

16. The system of claim 14, wherein the obtained data includes iterative obtaining of data as multiple replication operations in response to multiple corresponding updates performed in the data management system, wherein at each iteration, a current state of at least a portion of the data records in the data management system is obtained by copying at least the portion of the data records into the batch database.

17. The system of claim 14, wherein the computer-readable storage device comprises instructions which when executed by the computing device, cause the computing device to perform operations comprising:
   periodically receiving files with data for the data records from the data management system, wherein receiving the file is triggered based on an event associated with storing new data in the data management system;
   in response to receiving a file of the files, parsing the file to identify data records as separate records to be processed for identifying data to be replicated in the database system; and
   in response to parsing the received files, storing data records as obtained through the parsing, wherein at least two data records are associated with one common identifier associated with the same data object in the data management system.

18. The system of claim 14, wherein the computer-readable storage device comprises instructions which when executed by the computing device, cause the computing device to perform operations comprising:
   providing data to be replicated to the database system according to an update schedule, wherein the data that is to be replicated is from data that has been obtained from at least two files received from the data management system.

* * * * *